United States Patent
Sawada et al.

(10) Patent No.: US 9,207,409 B2
(45) Date of Patent: Dec. 8, 2015

(54) HEAD FOR FIBER OPTIC OPTOELECTRONIC SWITCH

(71) Applicant: OMRON CORPORATION, Kyoto (JP)

(72) Inventors: Yasuyoshi Sawada, Shanghai (CN);
Atsushi Teramura, Seoul (KR);
Masafumi Ijiri, Kawasaki (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 13/927,609

(22) Filed: Jun. 26, 2013

(65) Prior Publication Data

US 2014/0003773 A1   Jan. 2, 2014

(30) Foreign Application Priority Data

Jun. 29, 2012 (JP) .................................. 2012-146350

(51) Int. Cl.
| | |
|---|---|
| G02B 6/36 | (2006.01) |
| G02B 6/32 | (2006.01) |
| G02B 6/38 | (2006.01) |
| G02B 6/35 | (2006.01) |

(52) U.S. Cl.
CPC ................ *G02B 6/3857* (2013.01); *G02B 6/32* (2013.01); *G02B 6/3624* (2013.01); *G02B 6/3853* (2013.01); *G02B 6/351* (2013.01); *G02B 6/3582* (2013.01)

(58) Field of Classification Search
CPC ... G02B 6/3857; G02B 6/3853; G02B 6/3624
See application file for complete search history.

(56) References Cited

U.S. PATENT DOCUMENTS

| | | | | |
|---|---|---|---|---|
| 4,753,510 | A | * | 6/1988 | Sezerman ........................ 385/61 |
| 5,325,456 | A | * | 6/1994 | Cullen et al. ................... 385/138 |
| 6,931,178 | B2 | | 8/2005 | Saccomanno |
| 7,314,317 | B2 | | 1/2008 | Hamasaki et al. |
| 2004/0052476 | A1 | | 3/2004 | Houmault |
| 2005/0031271 | A1 | * | 2/2005 | Saccomanno ................... 385/88 |
| 2005/0213893 | A1 | | 9/2005 | Hamasaki et al. |

FOREIGN PATENT DOCUMENTS

| | | |
|---|---|---|
| DE | 4221040 | 1/1994 |
| FR | 2820789 | 8/2002 |
| JP | 62-10343 | 1/1987 |
| JP | 6-160668 | 6/1994 |
| KR | 10-2006-0044703 | 5/2006 |
| WO | 2004/063781 | 7/2004 |

OTHER PUBLICATIONS

Search report from E.P.O., mail date is Oct. 4, 2013.
Korea Office action, mail date is Jul. 7, 2014.

\* cited by examiner

*Primary Examiner* — Omar R Rojas
(74) *Attorney, Agent, or Firm* — Greenblum & Bernstein, P.L.C.

(57) ABSTRACT

An optical fiber head includes an optical fiber, a lens, and a casing which accommodates and holds the optical fiber and the lens. The casing has a crimping portion which accommodates and holds the optical fiber when a part of the crimping portion in the axial direction of the casing is plastically deformed such that the crimping portion is virtually equally reduced in diameter in a circumferential direction. The part of the optical fiber which is held by the crimping portion has a coating to coat the core wire. The crimping portion is provided at a back end side of the casing at a distance from the place where a leading end face of the optical fiber is positioned along the axial direction of the casing.

14 Claims, 6 Drawing Sheets

FIG. 12

HEAD FOR FIBER OPTIC OPTOELECTRONIC SWITCH

CROSS-REFERENCE TO RELATED APPLICATION

This application claims benefit of priority under 35 U.S.C. §119 to Japanese Patent Application No. 2012-146350 filed on Jun. 29, 2012, which is expressly incorporated herein by reference in its entirety.

BACKGROUND OF THE INVENTION

1. Technical Field

The present invention relates to an optical fiber head which has a leading end portion of an optical fiber and an optical element held by a casing, and particularly to an optical fiber head which can be preferably used as a head for a fiber optic optoelectronic switch.

2. Related Art

The optical fiber head is for appropriately performing light beam control on light to be emitted from a leading end face of the optical fiber or light entered the leading end face of the optical fiber by an optical element, and is configured to have the leading end face of the optical fiber and a back end face of the optical element arranged to face each other by making the casing hold the leading end portion of the optical fiber and the optical element. Here, a lens, a mirror, a polarization filter, an aperture, or the like is generally used as the optical element.

In the optical fiber head, it is required for the optical fiber and the optical element to be highly precisely aligned and fixed to the casing so that the optical axis of the optical fiber matches with the optical center of the optical element. Insufficient alignment prevents the optical fiber from providing desired optical properties, thus decreasing a yield.

Therefore, adhesives or crimping rings are conventionally used to fix the optical fiber to the casing so as to highly precisely fix the optical fiber to the casing. For example, JP 6-160668 A discloses an optical fiber head which has an adhesive used in fixing the optical fiber to the casing, and JP 62-10343 A discloses an optical fiber head which has a crimping ring used in fixing the optical fiber to the casing.

As discussed in JP 6-160668 A, in the case where the optical fiber is fixed to the casing with the adhesive, a core wire which includes a core and a clad is usually exposed at the leading end portion of the optical fiber so that the core wire is fixed to the casing with the adhesive.

On the other hand, as discussed in JP 62-10343 A, in the case where the optical fiber is fixed to the casing with the crimping ring, the core wire is usually kept covered with a coating at the leading end portion of the optical fiber, so that the optical fiber together with the coating is fixed to the casing by the crimping ring.

However, in the case where an adhesive is used to fix the optical fiber to the casing, it is required processes such as exposing the core wire, applying the adhesive to the core wire, and having the adhesive cured. That complicates the assembly operation, and accordingly, raises the manufacturing cost. Further, in order to ensure the sufficient holding power of the casing to hold the optical fiber, it is required to strictly control matters such as the application quantity of the adhesive and the cure condition. That also raises the manufacturing cost.

On the other hand, in the case where a crimping ring is used to fix the optical fiber to the casing, a process of exposing the core wire is not needed. As a result, the assembly operation becomes relatively simple, though, the number of parts increases, which also raises the manufacturing cost. In order to ensure the sufficient holding power of the casing to hold the optical fiber, it is required to strictly control accuracy of dimension of the parts including the crimping ring. That also raises the manufacturing cost.

SUMMARY

The present invention has been devised to solve the problems described above, and an object thereof is to provide an optical fiber head which has a simple configuration and can highly precisely position and fix an optical fiber to a casing, also can ensure the sufficient holding power of the casing to hold the optical fiber, and yet can be manufactured easily at a moderate price.

In accordance with one aspect of the present invention, an optical fiber head according to the present invention includes: an optical fiber which has a leading end face for emitting and/or receiving light at a leading end portion in an axial direction; a casing which has a substantially cylindrical shape with a front end and a back end along the axial direction and is configured to accommodate the leading end portion of the optical fiber with the optical fiber to be drawn out from the back end; and an optical element which is arranged so that a back end face of the optical element faces the leading end face of the optical fiber. The casing has a crimping portion which accommodates and holds the optical fiber by plastically deforming a part of the crimping portion in the axial direction of the casing such that the crimping portion is substantially equally reduced in diameter in a circumferential direction of the casing. The part of the optical fiber which is held by the crimping portion has a core wire which includes a core and a clad, and a coating to coat the core wire. The crimping portion is provided for a back end side of the casing and spaced apart, in the axial direction, from a position of the leading end face of the optical fiber.

In the optical fiber head according to the present invention, it is preferable that the leading end face of the optical fiber contact with the back end face of the optical element.

In the optical fiber head according to the present invention, it is preferable that an inner peripheral surface of the crimping portion part of the casing is provided with a shape of projections and recessions.

In the optical fiber head according to the present invention, it is preferable that an outer shape of the crimping portion is a regular polygonal prism or a cylinder.

In the optical fiber head according to the present invention, it is preferable that the optical element includes a lens which is press fitted into the casing at the place near to the front end of the casing.

In the optical fiber head according to the present invention, it is preferable that an outer peripheral surface of the lens has fine projections and recessions which provides squeezing during press-fitting. That is, in order to provide a more secure press-fit. For example, the squeezing function may be provided by crushing and deforming the recesses and projections during press-fitting.

In the optical fiber head according to the present invention, it is preferable that the lens has a cylindrical portion which is positioned at the front end side of the casing and a truncated cone portion which is positioned nearer to the back end side of the casing than the cylindrical portion is. In this case, it is preferable that the truncated cone portion has a diameter reduced with the decreasing distance from the back end side of the casing.

In the optical fiber head according to the present invention, it is preferable that the lens is an injection-molded article, and in this case, it is also preferable that the lens has a gate mark of the molding at the part near to the back end face of the lens.

In the optical fiber head according to the present invention, it is preferable that the optical element includes a mirror or a polarizing filter which is fixed to the casing at the place near to the front end of the casing.

In the optical fiber head according to the present invention, it is preferable that the optical element is an aperture which is included in an aperture stop portion provided at the front end of the casing.

According to the present invention, an optical fiber head which has a simple configuration and can highly precisely position and fix an optical fiber to a casing, also can ensure the sufficient holding power of the casing to hold the optical fiber, and yet can be manufactured easily at a moderate price is provided.

DETAILED DESCRIPTION

Embodiments of the present invention will be described in detail below with reference to the drawings. In the embodiments below, the same or common parts are denoted by the same reference numbers in the drawings and not described repeatedly.

First Embodiment

Figure 1:
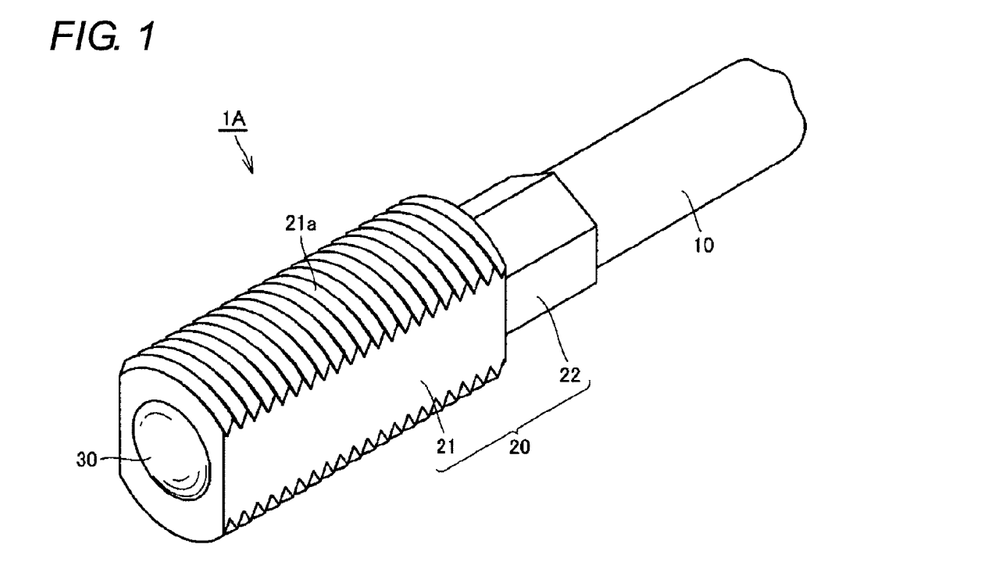
FIG. 1 is a perspective view of an optical fiber head according to a first embodiment of the present invention.
Figure 2:
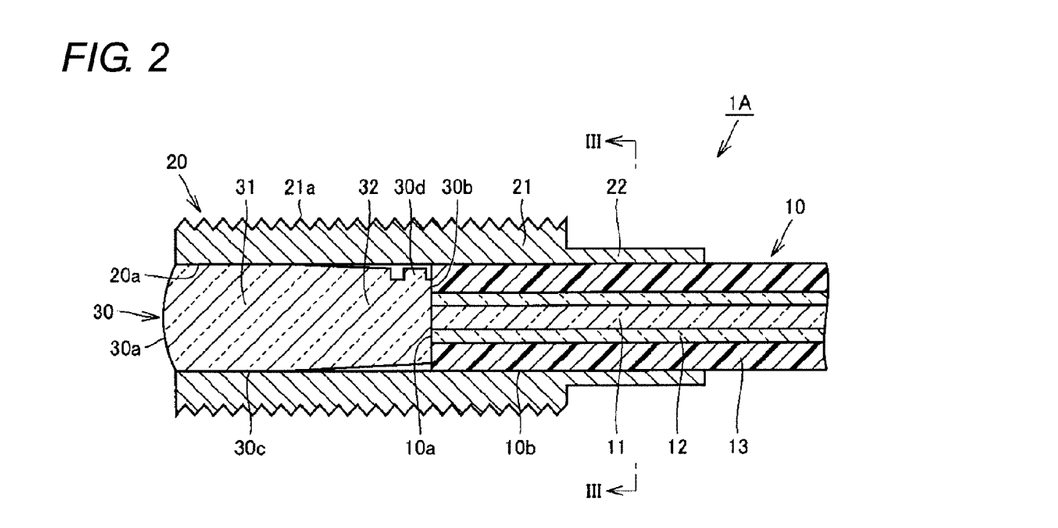
FIG. 2 is a cross-sectional view of the optical fiber head illustrated in FIG. 1.
Figure 3:
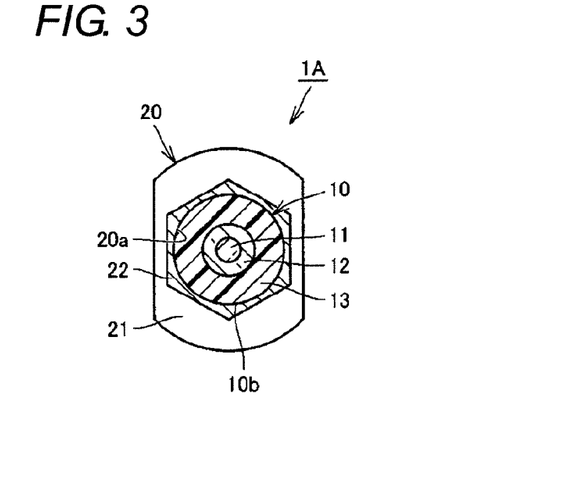
FIG. 3 is a cross-sectional view of the optical fiber head illustrated in FIG. 1 taken along a line III-III illustrated in FIG. 2.

FIG. 1 is a perspective view of an optical fiber head according to a first embodiment of the present invention, and FIG. 2 is a cross-sectional view of the optical fiber head illustrated in FIG. 1. FIG. 3 is a cross-sectional view of the optical fiber head illustrated in FIG. 1 taken along a line III-III illustrated in FIG. 2. First, a configuration of an optical fiber head 1A according to the present embodiment will be described with reference to FIGS. 1 to 3. Here, the optical fiber head 1A according to the embodiment is configured as a head for a fiber optic optoelectronic switch.

As illustrated in FIGS. 1 to 3, the optical fiber head 1A according to the embodiment includes an optical fiber 10, a casing 20, and a lens 30 as an optical element.

The optical fiber 10 is made of longitudinal members which includes the core wire consisting of a core 11 and a clad 12 and a coating 13 to coat the core wire. Both of the core 11 and the clad 12 are made of optical transparent members, and the coating 13 is made of a light blocking member.

As the optical fiber 10, either POF (Plastic Optical Fiber) or GOF (Glass Optical Fiber) can be used, and more preferably, POF can be used. As specific materials for the core 11 and the clad 12, resin materials represented by acrylic resin or fluororesin can be used for the POF, and all glass materials can be used for the GOF. As the coating 13, resin materials represented by polyvinyl chloride, for example, can be used.

The optical fiber 10 has a leading end face 10a for emitting and/or receiving light at a leading end portion of itself in the axial direction. At the leading end portion of the optical fiber 10, the core wire which includes the core 11 and the clad 12 is coated with the coating 13.

The casing 20 has a substantially hollow cylindrical shape and is made of a metallic member such as a stainless steel or steel member, for example. In the embodiment, since the casing 20 has a relatively simple configuration, it can be made of a casting which does not need any additional processing represented by cutting, for example.

The casing 20 has a through-hole extending along the axial direction from a front end (the left end in FIG. 2) to a back end (the right end in FIG. 2). The above described leading end portion of the optical fiber 10 and the lens 30 are arranged in the through-hole, therefore, the leading end portion of the optical fiber 10 and the lens 30 are accommodated in the casing 20.

The casing 20 has a body part 21 positioned at the front end side and a crimping portion 22 positioned at the back end side. The body part 21 has a thicker wall than the crimping portion 22 does and has a substantially cylindrical shape. The crimping portion 22 has a thinner wall than the body part 21 does and has the shape of a regular hexagonal prism. A male screw portion 21a is provided on an outer peripheral surface of the body part 21. The male screw portion 21a is used in setting the optical fiber head 1A.

The lens 30 is formed of an optical transparent member, for example, an injection molding made of resin material represented by acrylic resin or the like. The lens 30 has a virtually cylindrical shape with a front end face 30a (the left end face in FIG. 2) being a convex lens surface and a back end face 30b (the right end face in FIG. 2) being a plane.

The lens 30 has a cylindrical portion 31 which is positioned at the front end side of the casing 20 and a truncated cone portion 32 which is positioned nearer to the back end side of the casing 20 than the cylindrical portion 31 is. The truncated cone portion 32 has a diameter reduced toward the back end side of the casing 20. The lens 30 has a gate mark 30d, which is made in injection molding, on an outer peripheral surface 30c of the truncated cone portion 32 which is positioned near to the back end face 30b of the lens 30.

As the lens 30, glass lens or the like may be used other than the above described resin lens which is made of an injection molding.

As described above, both of the leading end portion of the optical fiber 10 and the lens 30 are accommodated in the through-hole provided in the casing 20. More specifically, the leading end portion of the optical fiber 10 is arranged to be positioned at the back end side of the through-hole of the casing 20 with the part other than the leading end portion of the optical fiber 10 being drawn out from the back end of the casing 20 to the outside. On the other hand, the lens 30 is arranged to be positioned at the front end side of the through-hole of the casing 20.

As a result, the leading end face 10a of the optical fiber 10 and the back end face 30b of the lens 30 are arranged to face each other in the casing 20, and particularly in the present embodiment, the leading end face 10a of the optical fiber 10 abuts against the back end face 30b of the lens 30.

The leading end portion of the optical fiber 10 is held as it is clinched by the crimping portion 22 provided for the casing 20. The crimping portion 22 is a part of the casing 20 along the axial direction which is plastically deformed such that the part of the casing 20 is virtually equally reduced in diameter in a circumferential direction. The crimping portion 22 holds the optical fiber 10 by pinching the optical fiber 10 inserted in the casing 20 when the crimping portion 22 is reduced in diameter.

More specifically, since the core wire including the core 11 and the clad 12 at the leading end portion of the optical fiber 10 which is held by the crimping portion 22 is covered by the coating 13, the suitably elastic coating 13 is pressed and deformed by the crimping portion 22 when the crimping portion 22 is reduced in diameter, and as a result, when the crimping portion 22 bites the outer peripheral surface 10b of the coating 13, the crimping portion 22 tightly hold the optical fiber 10. Further, since the elastic coating 13 is interposed between the crimping portion 22 and the core wire, deformation of the core wire is suppressed, therefore, the interposition can prevent the crimping of the optical fiber 10 from degrading the optical properties of the optical fiber 10.

Here, it is required to virtually equally reduce the crimping portion 22 in diameter in a circumferential direction. Such a virtually equal reduction of the crimping portion 22 in diameter in a circumferential direction enables highly precise positioning of the optical fiber 10 with respect to the casing 20, and accordingly, enables prevention of a shift of the optical axis of the optical fiber 10. Therefore, it is preferable that the outer contour of the crimping portion 22 in the crimping state is a regular polygonal prism or a cylinder, and in the present embodiment, it is a regular hexagonal prism as described above.

On the other hand, the lens 30 is held by the casing 20 when the lens 30 is press fitted and fixed to the casing 20. The process of press fitting and fixing the lens 30 to the casing 20 is mainly performed by pressing the cylindrical portion 31 of the lens 30 into the through-hole of the casing 20 with a large pressure, and as a result, when the outer peripheral surface 30c of the lens 30 is pressed against the inner peripheral surface 20a of the casing 20, the lens 30 is held by the casing 20. By using the press-fitting, the lens 30 can be highly precisely held to the casing 20, so that a shift of the optical center of the lens 30 can be prevented.

Figure 4A:
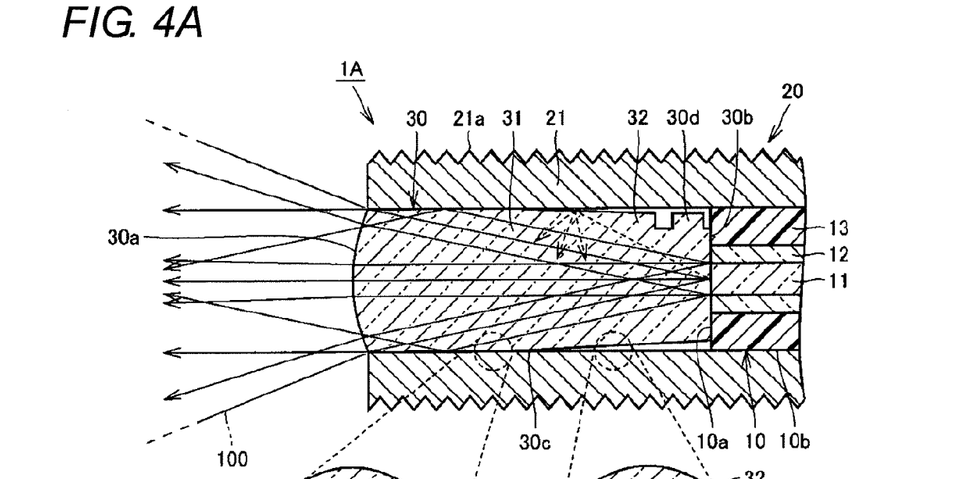
FIGS. 4A, 4B and 4C are a schematic diagram illustrating an example of optical paths in the optical fiber head illustrated in FIG. 1 and enlarged cross-sectional views of main parts illustrating detailed structures of the optical fiber head.
Figure 4B:
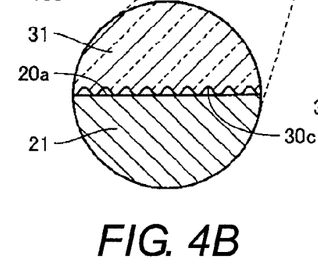
Figure 4C:
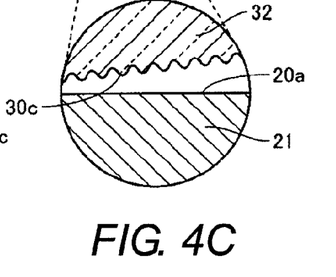

Here, the outer peripheral surface 30c of the lens 30 has fine projections and recessions (see FIGS. 4B and 4C). Since the lens 30 is adapted to have these fine projections and recessions on its outer peripheral surface 30c, the projections among the fine projections and recessions function as a squeeze in press-fitting, enabling the lens 30 to be press fitted into the casing 20 more smoothly and tightly.

Therefore, the above described configuration enables both of the optical fiber 10 and the lens 30 to be positioned and fixed to the casing 20, thus, enables the optical axis of the optical fiber 10 and the optical center of the lens 30 to be easily match, so that the optical fiber head can be adapted to provide desired optical properties.

Here, as illustrated in FIG. 2, the crimping portion 22 is provided at the back end side of the casing 20 at a distance from the place where a leading end face 10a of the optical fiber 10 is positioned along the axial direction of the casing 20. That configuration can prevent the pressing out effect of the optical fiber 10 in the axial direction of the casing 20 caused by the crimping of the optical fiber 10 by the crimping portion 22 from affecting the leading end face 10a of the optical fiber 10, therefore, enable highly precise positioning of the leading end face 10a of the optical fiber 10.

By arranging the leading end face 10a of the optical fiber 10 to abut against the back end face 30b of the lens 30 as described above by using this configuration, the leading end face 10a of the optical fiber 10 is pressed against the back end face 30b of the lens 30 when the optical fiber 10 is pressed out in the axial direction of the casing 20, therefore, the shift of the optical axis of the optical fiber 10 can be prevented more securely.

FIG. 4A is a schematic diagram illustrating an example of optical paths in the optical fiber head illustrated in FIG. 1, and FIGS. 4B and 4C are enlarged cross-sectional views of main parts illustrating detailed structures of the optical fiber head. Next, optical paths in the optical fiber head 1A and detailed structures according to the present embodiment will be described with reference to FIGS. 4A to 4C. Meanwhile, the optical paths illustrated in FIG. 4A schematically illustrate the optical paths in the case where light is projected by the optical fiber head 1A according to the embodiment.

As illustrated in FIG. 4A, the light propagated through the core wire of the optical fiber 10 exits the optical fiber 10 from the leading end face 10a of the optical fiber 10. The light exited from the leading end face 10a of the optical fiber 10 enters the lens 30 from the back end face 30b of the lens 30 and propagates through the lens 30 toward the front end face 30a to reach the front end face 30a. On this occasion, the light exited from the leading end face 10a of the optical fiber 10 at a relatively large angle with respect to the optical axis is reflected mainly from the outer peripheral surface 30c of the cylindrical portion 31 of the lens 30, changes the angle and reaches the front end face 30a of the lens 30.

The light other than which passes through the optical center of the lens 30 of the light which has reached the front end face 30a of the lens 30 is refracted at the front end face 30a of the convex lens surface and exits the lens 30 from the front end face 30a. The light passed through the optical center of the lens 30 of the light which has reached the front end face 30a of the lens 30 is transmitted through the lens 30 without being refracted at the front end face 30a and exits the lens 30 from the front end face 30a.

As a result, an irradiation light 100 emitted from the optical fiber head 1A is condensed within measure. Therefore, with the lens 30 provided for the optical fiber head 1A, diffusion of the irradiation light 100 emitted from the optical fiber head 1A can be suppressed as compared with the case where the lens 30 is not provided for the optical fiber head 1A, and the amount of light can be increased within the irradiation range.

Here, as illustrated in FIGS. 4B and 4C, the optical fiber head 1A according to the embodiment is provided with the fine projections and recessions on the outer peripheral surface 30c of the lens 30 as described above. The fine projections and recessions function as a squeeze in press fitting the lens 30 into the casing 20 as described above, and also improve the optical properties of the optical fiber head 1A.

That is, with fine projections and recessions provided on the outer peripheral surface 30c of the lens 30, the fine projections and recessions is irradiated with the light exited from the leading end face 10a of the optical fiber 10 at a large angle with respect to the optical axis, therefore, the light is diffused at the fine projections and recessions part. Especially the light exited at a remarkably large angle with respect to the optical axis largely changes the angle and is repeatedly reflected in the lens 30. As a result, the light attenuates and hardly reaches the front end face 30a of the lens 30. This can prevent stray light from being contained in the irradiation light 100 emitted from the optical fiber head 1A, therefore, this can improve the optical properties of the optical fiber head 1A.

As illustrated in FIG. 4A, the optical fiber head 1A according to the embodiment has the gate mark 30d, which is made in the injection molding, on the outer peripheral surface 30c of the truncated cone portion 32 near to the back end face 30b of the lens 30 as described above. With this configuration, it is possible to make the outer peripheral surface 30c of the cylindrical portion 31 near to the front end face 30a of the lens 30 which mainly reflects the light within in the lens 30 smooth. Therefore, as compared with the case where the lens 30 has the gate mark 30d on the outer peripheral surface 30c of the cylindrical portion 31, this configuration can suppress a decrease of the amount of light and occurrence of the stray light, and accordingly, can prevent the optical properties of the optical fiber head 1A from degrading.

Although the effects of the case where light is projected by the optical fiber head 1A according to the embodiment have been described above, the same effects can be provided also in the case where light is received by the optical fiber head 1A. In the latter case, an effect of suppressing an ambient light entering the optical fiber 10 can be provided instead of the effect of preventing stray light from being contained in the light to be irradiated from the optical fiber head 1A.

Figure 5:
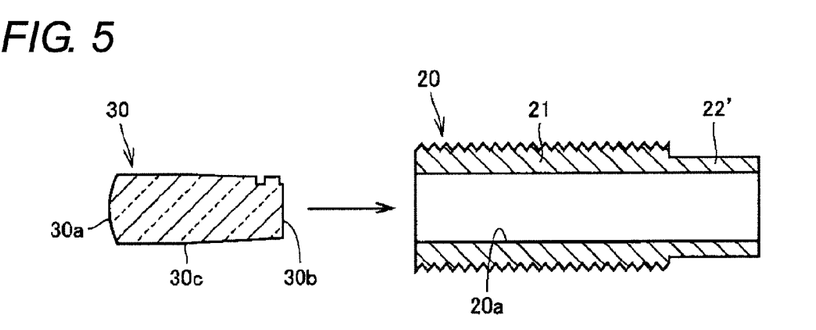
FIG. 5 is a schematic diagram illustrating an assembly process of the optical fiber head according to the first embodiment of the present invention.
Figure 6:
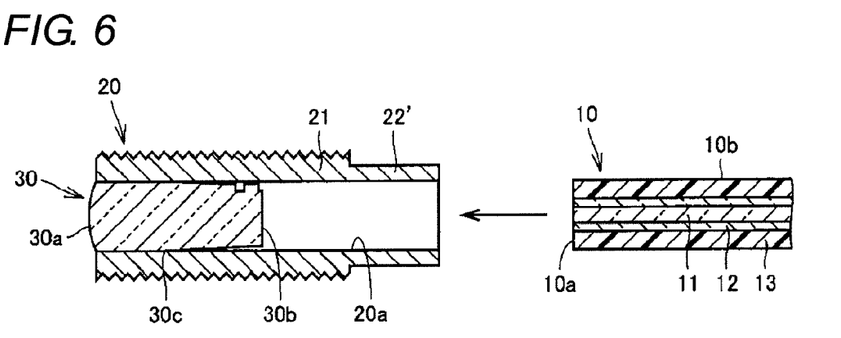
FIG. 6 is a schematic diagram illustrating an assembly process of the optical fiber head according to the first embodiment of the present invention.
Figures 7A, 7B:
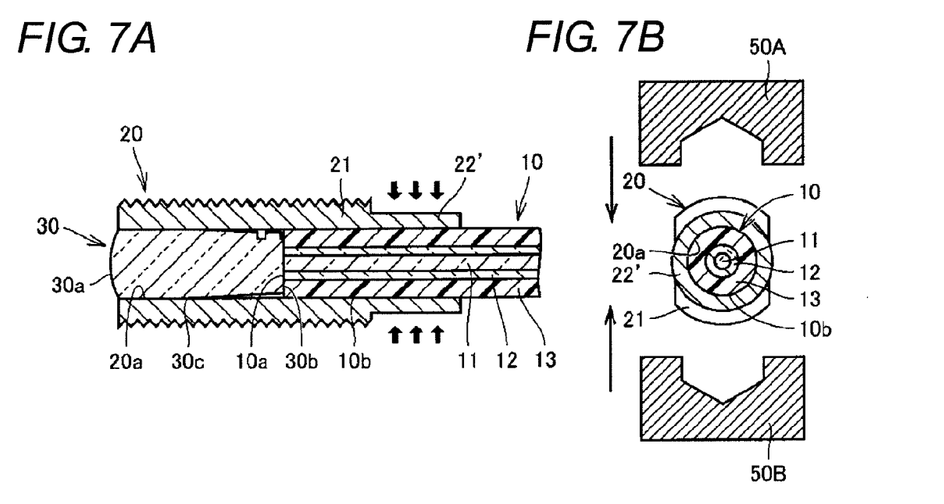
FIGS. 7A and 7B are schematic diagrams illustrating an assembly process of the optical fiber head according to the first embodiment of the present invention.

FIGS. 5 to 7 are schematic diagrams illustrating an assembly process of the optical fiber head according to the embodiment. Next, an assembly process of the optical fiber head 1A according to the embodiment will be described with reference to FIGS. 5 to 7.

In assembling the above described optical fiber head 1A according to the embodiment, first, the lens 30 is press fitted into the casing 20 as illustrated in FIG. 5. On this occasion, the lens 30 is press fitted into the through-hole of the casing 20 from the front end side of the casing 20. As a result, the lens 30 is positioned and fixed to the casing 20.

Here, in the present embodiment, since the truncated cone portion 32 which has a diameter reduced toward the back end face 30b is provided near to the back end of the lens 30 as described above, the lens 30 can be smoothly inserted into the casing 20 at the press-fitting.

Next, as illustrated in FIG. 6, the leading end portion of the optical fiber 10 is inserted in the casing 20 which is incorporated with the lens 30. On this occasion, the leading end portion of the optical fiber 10 is inserted in the through-hole of the casing 20 from the back end side of the casing 20.

Here, since the leading end portion of the optical fiber 10 may be left as the core wire covered with the coating 13, it is not required to remove the coating 13 to expose the core wire. Further, after the optical fiber 10 is inserted in the casing 20, it is preferable that the leading end face 10a of the optical fiber 10 abuts against the back end face 30b of the lens 30 which has been previously incorporated in the casing 20.

Next, as illustrated in FIGS. 7A and 7B, crimping is performed by using crimping tools 50A and 50B on a crimping portion planned area 22' of the casing 20 which is to be the crimping portion 22 after the crimping is done.

Here, as the crimping tools 50A and 50B, half shell tools which are to be combined to form a regular hexagonal prism room inside them are used. Then, for the above described crimping, these crimping tools 50A and 50B are arranged to sandwich the crimping portion planned area 22' of the casing 20, and the crimping is performed as the crimping tools 50A and 50B are moved to approach each other.

As a result, the crimping portion planned area 22' is plastically deformed to be virtually equally reduced in diameter in the circumferential direction, so that the outer contour changes into a hexagonal prism to form the crimping portion 22 at the back end side of the casing 20. Accordingly, the leading end portion of the optical fiber 10 is positioned and fixed to the casing 20.

Here, assembly of the above described optical fiber head 1A according to the present embodiment is completed. Although an assembly process in the case where the lens 30 is press fitted into the casing 20 before the crimping of the leading end portion of the optical fiber 10 to the casing 20 is exemplified above, the crimping of the leading end portion of the optical fiber 10 to the casing 20 may be performed before the lens 30 is press fitted into the casing 20.

As described above, the optical fiber head 1A of the present embodiment can highly precisely position and fix the optical fiber 10 to the casing 20 with a simple configuration, and also can ensure the sufficient holding power of the casing 20 to hold the optical fiber 10, and yet can be manufactured easily at a moderate price.

As compared with the case where the optical fiber is fixed to the casing by using a crimping ring, the length of the optical fiber in the axial direction which is to be affected by the clamping force applied to the optical fiber to fix the optical fiber can be made longer in the optical fiber head 1A of the present embodiment. The optical fiber head 1A of the present embodiment can disperse the clamping force which affects the optical fiber in the axial direction of the optical fiber while ensuring the sufficient holding power of the casing to hold the optical fiber in the above described manner. Therefore, it can prevent the clamping force from locally concentrating on a predetermined part of the optical fiber, and provide an effect of protecting the optical fiber against fracture.

Unlike the case where the optical fiber is fixed to the casing by using an adhesive, the optical fiber head 1A according to the present embodiment does not require an adhesive, therefore, the optical fiber head 1A can be installed in a high temperature environment in which an optical fiber head having the optical fiber fixed to the casing by using an adhesive cannot be installed because of the low heat resistance of the adhesive, or can be installed in a clean environment such as a semiconductor device manufacturing floor in which an optical fiber head having the optical fiber fixed to the casing by using an adhesive cannot be installed because the adhesive generates outgas, thus, the optical fiber head 1A can provide an effect of significantly enlarge the scope of the applicability of the optical fiber head.

Figure 8:
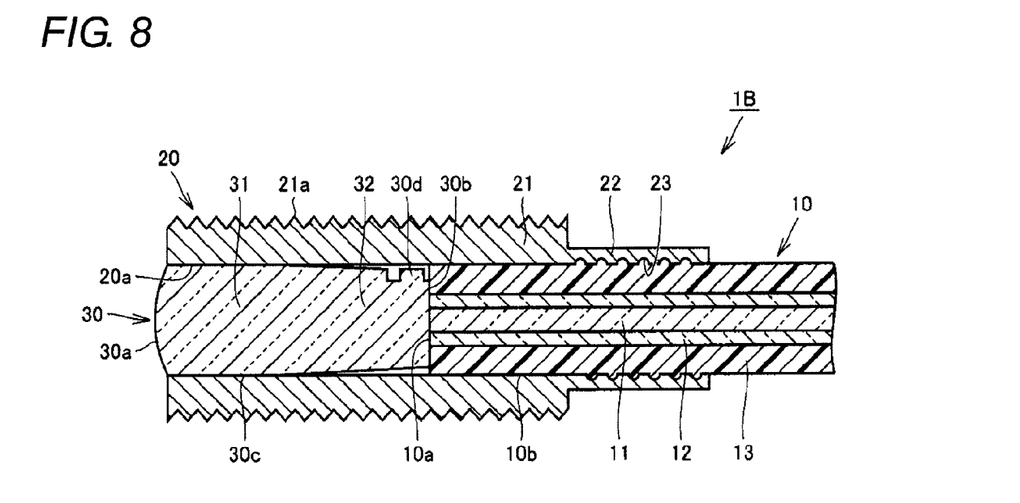
FIG. 8 is a cross-sectional view of an optical fiber head according to a first modification.
Figure 9:
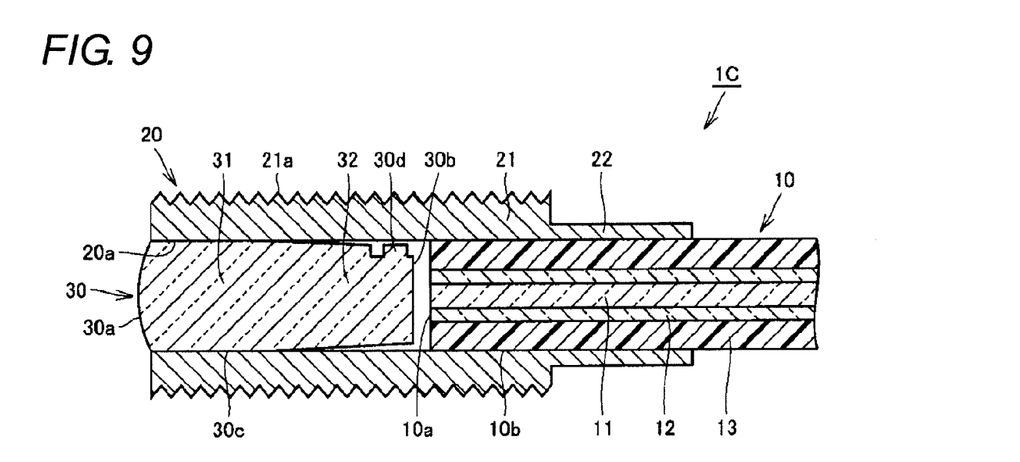
FIG. 9 is a cross-sectional view of an optical fiber head according to a second modification.
Figure 10:
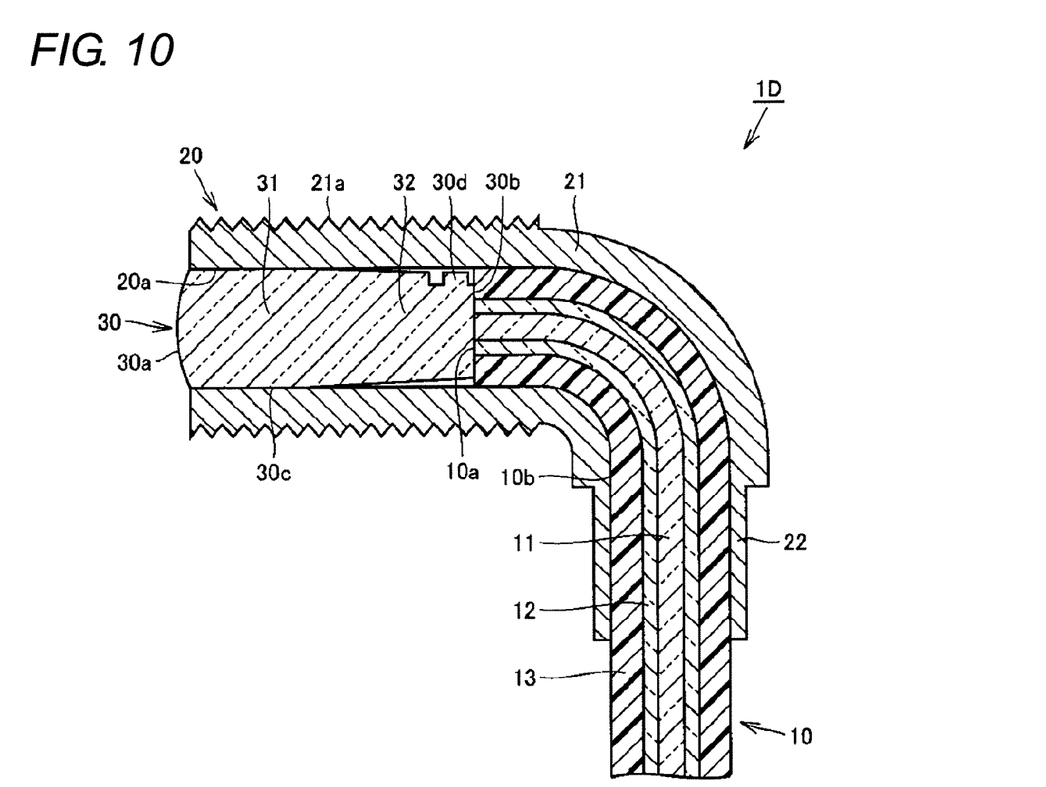
FIG. 10 is a cross-sectional view of an optical fiber head according to a third modification.

FIGS. 8 to 10 are cross-sectional views of the optical fiber heads according to first to third modifications based on the above described embodiment. The optical fiber heads 1B to 1D according to the first to third modifications based on the above described embodiment will be described below with reference to FIGS. 8 to 10.

As illustrated in FIG. 8, the optical fiber head 1B according to the first modification is different from the above described optical fiber head 1A according to the present embodiment only in that a female screw portion 23 is provided on an inner peripheral surface 20a of a part of the casing 20 at which the crimping portion 22 is positioned, resulting in providing projections and recessions on the inner peripheral surface 20a. The female screw portion 23 can be formed by performing additional processing such as cutting work on the casing 20 which is made of, for example, a casting.

With this configuration, in addition to the effect of the above described embodiment, an effect of further strengthening the holding power of the casing 20 to hold the optical fiber 10 can be provided since the inner peripheral surface 20a of the crimping portion 22 with the female screw portion 23 formed thereon more tightly bites the outer peripheral surface 10b of the coating 13.

Meanwhile, the projections and recessions formed on the inner peripheral surface 20a of the crimping portion 22 do not need to be in the above described female screw shape, and one or more annular grooves or annular projections may be provided on the inner peripheral surface 20a of the crimping portion 22 along the axial direction. Alternatively, a plurality of projections may be provided as a sequence of points on the inner peripheral surface 20a of the crimping portion 22.

As illustrated in FIG. 9, the optical fiber head 10 according to the second modification is different from the above described optical fiber head 1A according to the present embodiment only in that the leading end face 10a of the optical fiber 10 does not abut against the back end face 30b of the lens 30. Also with this configuration, the effect similar to that described in the present embodiment can be provided.

As illustrated in FIG. 10, the optical fiber head 1D according to the third modification is different from the above described optical fiber head 1A according to the present embodiment only in that a corner portion is provided on a part near to the back end of the body part 21 of the casing 20 with the crimping portion 22 provided on a back end side part of the corner portion. Also with this configuration, the effect similar to that described in the present embodiment can be provided.

Although the case in which a condenser lens is used as the lens 30 has been exemplified above, it is needless to say that the condenser lens may be substituted by various other lenses such as a collimator lens which collimates light emitted from an optical fiber head.

Second Embodiment

Figure 11:
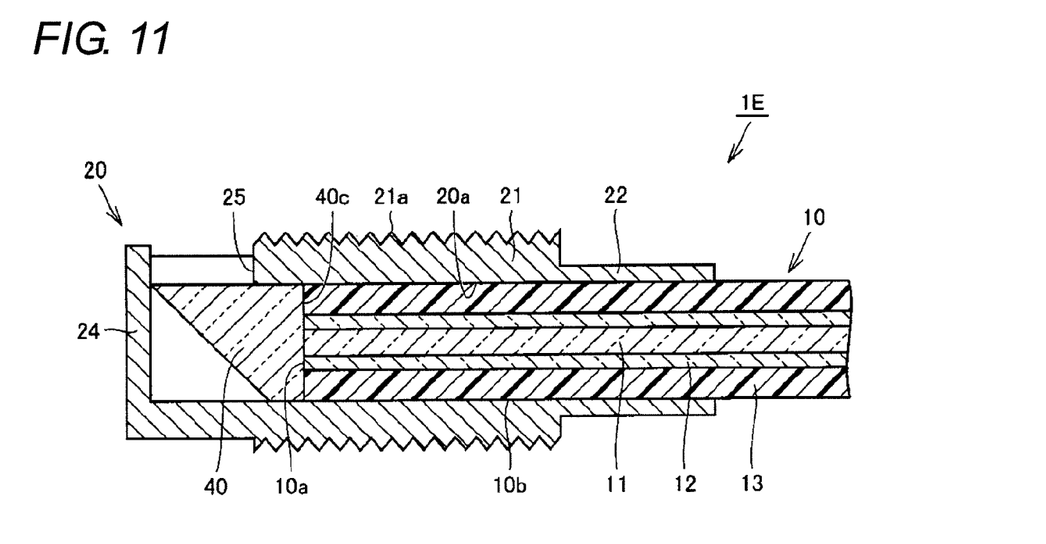
FIG. 11 is a cross-sectional view of an optical fiber head according to a second embodiment of the present invention.

FIG. 11 is a cross-sectional view of an optical fiber head according to a second embodiment of the present invention. A configuration of an optical fiber head 1E according to the present embodiment will be described with reference to FIG. 11.

As illustrated in FIG. 11, the optical fiber head 1E according to the present embodiment is different from the above described optical fiber head 1A according to the first embodiment only in that the optical element arranged to face the leading end face 10a of the optical fiber 10 is a mirror 40.

Specifically, the optical fiber head 1E has the casing 20 which has a virtually hollow cylindrical shape with the front end blocked by a block portion 24 and has the mirror 40 incorporated in the casing 20 at the position near to the front end of the casing 20 so that a back end face 40c of the mirror 40 faces the leading end face 10a of the optical fiber 10. The mirror 40 is for changing the direction of travel of the incident light. An opening window 25 for allowing the light to pass is provided at the body part 21 near to the front end of the casing 20.

The optical fiber head 1E with this configuration can provide the effect similar to that described in the first embodiment. That is, with the above described configuration, the optical fiber head is adapted to have a simple configuration to highly precisely position and fix the optical fiber 10 to the casing 20 and also to ensure the sufficient holding power of the casing 20 to hold the optical fiber 10, and yet can be manufactured easily at a moderate price.

Third Embodiment

Figure 12:
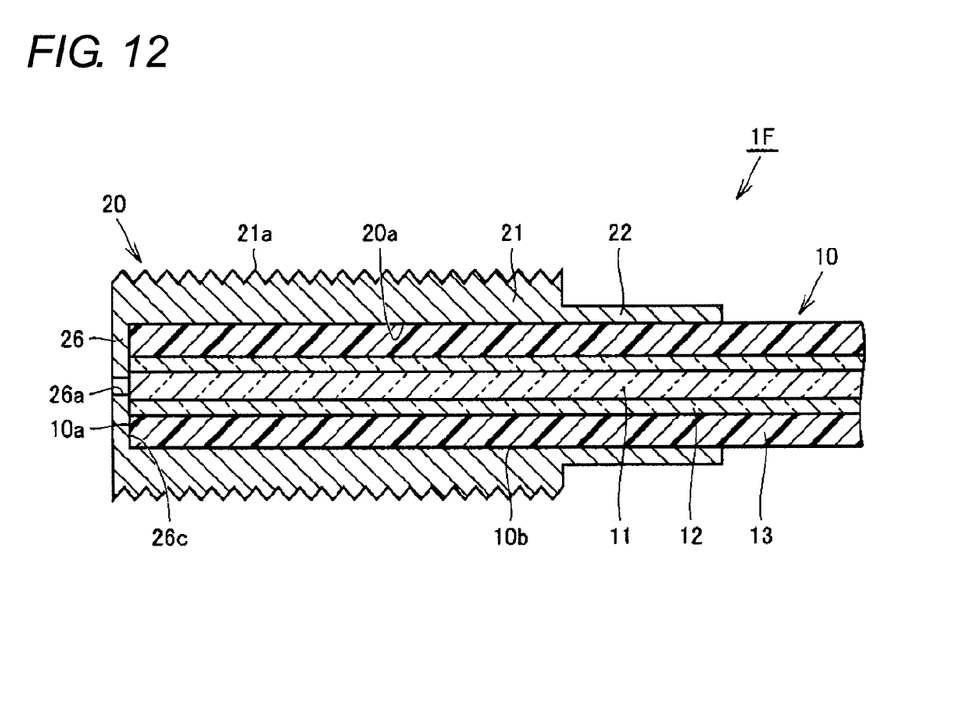
FIG. 12 is a cross-sectional view of an optical fiber head according to a third embodiment of the present invention.

FIG. 12 is a cross-sectional view of an optical fiber head according to a third embodiment of the present invention. An optical fiber head 1F according to the present embodiment will be described below with reference to FIG. 12.

As illustrated in FIG. 12, the optical fiber head 1F according to the present embodiment is different from the above described optical fiber head 1A according to the first embodiment only in that the optical element arranged to face the leading end face 10a of the optical fiber 10 is an aperture 26a.

Specifically, the optical fiber head 1F has the casing 20 which has a virtually hollow cylindrical shape with the front end almost blocked by an aperture stop portion 26, and allows the leading end portion of the optical fiber 10 to be inserted to the front end of the casing 20 so that the leading end face 10a of the optical fiber 10 faces the back end face 26c of the aperture stop portion 26. Here, the aperture 26a is formed of an opening portion provided on the aperture stop portion 26 of the casing 20 and is for making the irradiation range proper by blocking extra light to prepare the shape of the beam spot.

Also the optical fiber head 1F with this configuration can provide the effect similar to that described in the first embodiment. That is, with the above described configuration, the optical fiber head is adapted to have a simple configuration to highly precisely position and fix the optical fiber 10 to the casing 20 and also to ensure the sufficient holding power of the casing 20 to hold the optical fiber 10, and yet can be manufactured easily at a moderate price.

Although the first to third embodiment of the present invention and their modifications have been exemplified by the cases where the present invention is applied to an optical fiber head which includes a lens, a mirror, or an aperture as an optical element, it is needless to say that the present invention can also be applied to other optical fiber heads such as the optical fiber head which includes a polarizing filter as an optical element.

Although the first to third embodiments of the present invention and their modifications have been exemplified by the cases where the present invention is applied to an optical fiber head which is configured to have a male screw portion formed on the outer peripheral surface of the casing, it is needless to say that the male screw portion is not necessary and the present invention can be applied to an optical fiber head which does not include the male screw portion.

Although the first to third embodiments of the present invention and their modifications have been exemplified by the cases where the casing is configured to have a cylindrical room formed therein as a through-hole, the shape of the through-hole is not limited to that and the through-hole may be locally reduced or expanded in diameter to fit the shape of the leading end portion of the optical fiber and the optical element which are accommodated in the through-hole.

Further, it is needless to say that the characteristic configurations described in the first to third embodiments of the present invention and their modifications may be combined with each other within the allowable range without departing from the spirit of the present invention.

It should be construed that the embodiments and modifications thereof disclosed here are not for limiting but for exemplifying the present invention in all aspects. The technical scope of the present invention is defined by the appended claims and all modifications within the equivalent description and meaning of the appended claims are intended to be included in the invention.

What is claimed is:

1. An optical fiber head comprising:
an optical fiber which has a leading end face for emitting and/or receiving light at a leading end portion in an axial direction;
an optical element having an optical axis and arranged so that a back end face of the optical element faces the leading end face of the optical fiber; and
a casing which has a substantially cylindrical shape with a front end and a back end along the axial direction, the casing accommodating the optical element and the leading end portion of the optical fiber with the optical fiber extending out from the back end, wherein
the casing has a crimping portion formed thereon, the crimping portion accommodates and holds the optical fiber, and a part of the crimping portion is plastically deformed in the axial direction of the casing such that the crimping portion is substantially equally reduced in diameter in a circumferential direction of the casing and the leading end face of the optical fiber securely contacts the back end face of the optical element,
the part of the optical fiber which is held by the crimping portion has a core wire which includes a core and a clad, and a coating to coat the core wire,
wherein both the core wire and the coating, at the leading end face of the optical fiber, are pressed against the back end face of the optical element by the crimping portion so as to prevent shifting of the optical axis, and
the crimping portion is provided at a back end side of the casing and spaced apart, in the axial direction, from a position of the leading end face of the optical fiber.

2. The optical fiber head according to claim 1, wherein an inner peripheral surface of the crimping portion of the casing is provided with projections and recessions.

3. The optical fiber head according to claim 1, wherein an outer shape of the crimping portion is a regular polygonal prism or a cylinder.

4. The optical fiber head according to claim 1, wherein the optical element includes a lens which is press fitted into the casing at the place near to the front end of the casing.

5. The optical fiber head according to claim 4, wherein an outer peripheral surface of the lens has fine projections and recessions which provides squeezing during press-fitting.

6. The optical fiber head according to claim 4, wherein the lens has a cylindrical portion which is positioned at the front end side of the casing and a truncated cone portion which is positioned nearer to the back end side of the casing than the cylindrical portion is, and
the truncated cone portion has a diameter reduced with the decreasing distance from the back end side of the casing.

7. The optical fiber head according to claim 4, wherein the lens is an injection-molded article, and
the lens has a gate mark of the molding at the part near to the back end face of the lens.

8. The optical fiber head according to claim 1, wherein the optical element includes a mirror or a polarizing filter which is fixed to the casing at the place near to the front end of the casing.

9. The optical fiber head according to claim 1, wherein the optical element includes an aperture which is included in an aperture stop portion provided at the front end of the casing.

10. The optical fiber head according to claim 5, wherein the lens has a cylindrical portion which is positioned at the front end side of the casing and a truncated cone portion which is positioned nearer to the back end side of the casing than the cylindrical portion is, and
the truncated cone portion has a diameter reduced with the decreasing distance from the back end side of the casing.

11. The optical fiber head according to claim 5, wherein the lens is an injection-molded article, and
the lens has a gate mark of the molding at the part near to the back end face of the lens.

12. The optical fiber head according to claim 6, wherein the lens is an injection-molded article, and
the lens has a gate mark of the molding at the part near to the back end face of the lens.

13. The optical fiber head according to claim 2, wherein an outer shape of the crimping portion is a regular polygonal prism or a cylinder.

14. The optical fiber head according to claim 2, wherein the optical element includes a lens which is press fitted into the casing at the place near to the front end of the casing.

* * * * *